(12) United States Patent
Kuno et al.

(10) Patent No.: US 10,792,889 B2
(45) Date of Patent: Oct. 6, 2020

(54) THERMAL TRANSFER SHEET, METHOD FOR PRODUCING DECORATED ARTICLE AND DECORATED ARTICLE

(71) Applicant: TOYODA GOSEI, CO., LTD., Kiyosu-shi, Aichi-ken (JP)

(72) Inventors: Koji Kuno, Kiyosu (JP); Tsuyoshi Suzuki, Kiyosu (JP); Ryohei Utsumi, Ritto (JP); Yukiyoshi Soma, Ritto (JP); Daisuke Miyachi, Kyoto (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 329 days.

(21) Appl. No.: 15/920,507

(22) Filed: Mar. 14, 2018

(65) Prior Publication Data

US 2018/0272655 A1 Sep. 27, 2018

(30) Foreign Application Priority Data

Mar. 21, 2017 (JP) ................... 2017-054975

(51) Int. Cl.
| | |
|---|---|
| *B32B 7/02* | (2019.01) |
| *B32B 7/12* | (2006.01) |
| *B32B 37/12* | (2006.01) |
| *B44C 1/17* | (2006.01) |
| *B32B 7/06* | (2019.01) |

(52) U.S. Cl.
CPC ............... *B32B 7/02* (2013.01); *B32B 7/06* (2013.01); *B32B 7/12* (2013.01); *B32B 37/1207* (2013.01); *B44C 1/172* (2013.01); *B44C 1/1716* (2013.01); *B44C 1/1729* (2013.01); *B32B 2037/1223* (2013.01); *B32B 2037/1269* (2013.01); *B32B 2250/04* (2013.01); *B32B 2405/00* (2013.01); *B32B 2451/00* (2013.01)

(58) Field of Classification Search
CPC .......... B32B 7/02; B32B 7/06; B32B 2250/04
USPC ....................................... 428/32.75
See application file for complete search history.

(56) References Cited

U.S. PATENT DOCUMENTS

| | | | | |
|---|---|---|---|---|
| 6,033,763 | A * | 3/2000 | Laprade | B44C 1/1716 428/202 |
| 2006/0047087 | A1* | 3/2006 | Konishi | C08F 8/20 525/358 |
| 2018/0272655 | A1* | 9/2018 | Kuno | B32B 27/304 |

FOREIGN PATENT DOCUMENTS

| | | |
|---|---|---|
| JP | 0592672 A | 4/1993 |
| JP | 0691758 A | 4/1994 |

(Continued)

*Primary Examiner* — Betelhem Shewareged
(74) *Attorney, Agent, or Firm* — Posz Law Group, PLC

(57) ABSTRACT

A thermal transfer sheet includes a support film and a transfer layer provided on one surface of the support film. The transfer layer at least includes a decorative layer and an adhesive layer provided on an obverse side of the decorative layer. The adhesive layer includes a first adhesive layer and a second adhesive layer laminated on the first adhesive layer. The first adhesive layer is positioned on an obverse side of the second adhesive layer. The first adhesive layer is made of a first resin having thermal plasticity and has a lower viscosity than the second adhesive layer. The second adhesive layer is made of a second resin having thermal plasticity and has a higher glass-transition point than the first adhesive layer. Monomer units constituting the first resin and monomer units constituting the second resin are partly or entirely identical.

6 Claims, 1 Drawing Sheet

(56) References Cited

FOREIGN PATENT DOCUMENTS

| JP | 2003-246194 A | 9/2003 |
| JP | 2012-111045 A | 6/2012 |

\* cited by examiner

THERMAL TRANSFER SHEET, METHOD FOR PRODUCING DECORATED ARTICLE AND DECORATED ARTICLE

BACKGROUND OF THE INVENTION

The present invention relates to a thermal transfer sheet, a method for producing a decorated article, and a decorated article.

A decorated article has a substrate and a decoration layer provided on the surface of the substrate and is used in a wide variety of applications such as exterior trim parts for vehicles. As a method for producing a decorated article, a method using a hot stamp technology is known (see, Japanese Laid-Open Patent Publication No. 6-091758 and Japanese Laid-Open Patent Publication No. 2012-111045). In the hot stamp technology, a thermal transfer sheet having a decorative layer and an adhesive layer is attached to a surface of a substrate by thermocompression bonding with the result that the decorative layer and adhesive layer are transferred to the surface of the substrate. In this manner, a decoration layer is formed on the surface of the substrate. The adhesive layer is constituted of a thermal adhesive provided on the surface of the decorative layer.

It is sometimes required that a decorated article be water resistant in order to suppress removal of a decoration layer due to water permeation, as is in the case where the decorated article is applied to exterior trim parts for vehicles exposed to outside air. The water resistance of a decoration layer formed by transfer to a substrate made of a high melting-point material tends to be lower than that of a decoration layer formed by transfer to a substrate made of a low melting-point material.

It is considered that the decrease of water resistance is caused by the state of the boundary between the surface of the substrate and the adhesive layer of the decoration layer. More specifically, in the case of a substrate made of a low melting-point material, since the surface of the substrate is melted during thermocompression bonding, the surface of the substrate is unified with the adhesive layer of the decoration layer at the boundary of them. In contrast, in the case of a substrate made of a high melting-point material, since the surface of the substrate rarely melts during thermocompression bonding, the surface of the substrate is rarely unified with the adhesive layer of the decoration layer, with the result that an interface is produced at the boundary. When water permeates into the interface, removal of the decoration layer due to water permeation easily takes place.

However, even if a substrate is made of a high melting-point material, if the temperature during thermocompression bonding is raised to the melting point of the substrate or more, the surface of the substrate melts during thermocompression bonding and is successfully unified with the decoration layer. Because of this, even if a substrate is made of a high melting-point material, there is a possibility that water resistance of the decoration layer can be suppressed from decreasing. However, if so, other members such as a support film constituting the thermal transfer sheet, and an elastic member pressurizing the thermal transfer sheet to the substrate during thermocompression bonding must be formed of materials having high heat resistance, with the result that the cost for forming the decoration layer increases.

SUMMARY OF THE INVENTION

An objective of the present invention is to provide a thermal transfer sheet that is capable of forming a decoration layer having high water resistance even if the surface of a substrate does not melt; a method for producing the decorated article; and a decorated article having a decoration layer having high water resistance.

To achieve the foregoing objective, a thermal transfer sheet is provided that includes a support film and a transfer layer provided on one surface of the support film. The transfer layer at least includes a decorative layer and an adhesive layer provided on an obverse side of the decorative layer. The adhesive layer includes a first adhesive layer and a second adhesive layer laminated on the first adhesive layer. The first adhesive layer is positioned on an obverse side of the second adhesive layer. The first adhesive layer is made of a first resin having thermal plasticity and has a lower viscosity than the second adhesive layer. The second adhesive layer is made of a second resin having thermal plasticity and has a higher glass-transition point than the first adhesive layer. Monomer units constituting the first resin and monomer units constituting the second resin are partly or entirely identical.

To achieve the foregoing objective, a method for producing a decorated article is provided. The decorated article includes a substrate, an adhesive layer, and a decorative layer. The adhesive layer and the decorative layer are sequentially laminated on the substrate. The method includes: disposing the above-described thermal transfer sheet on the substrate such that the adhesive layer of the thermal transfer sheet is in contact with the substrate; conducting thermal transfer processing to transfer the transfer layer to the substrate; and removing the support film of the thermal transfer sheet.

To achieve the foregoing objective, a decorated article is provided that includes a substrate, an adhesive layer, and a decorative layer. The adhesive layer and the decorative layer are sequentially laminated on the substrate. The adhesive layer contains a first resin and a second resin that have thermal plasticity. The first resin and the second resin are mixed in the adhesive layer such that a ratio of the first resin increases and a ratio of the second resin decreases toward the substrate in a thickness direction of the adhesive layer. Monomer units constituting the first resin and monomer units constituting the second resin are partly or entirely identical. The first resin has a lower viscosity than the second resin. The second resin has a higher glass-transition point than the first resin.

DETAILED DESCRIPTION OF THE PREFERRED EMBODIMENTS

One embodiment of the present invention will now be described.

Figure 1:
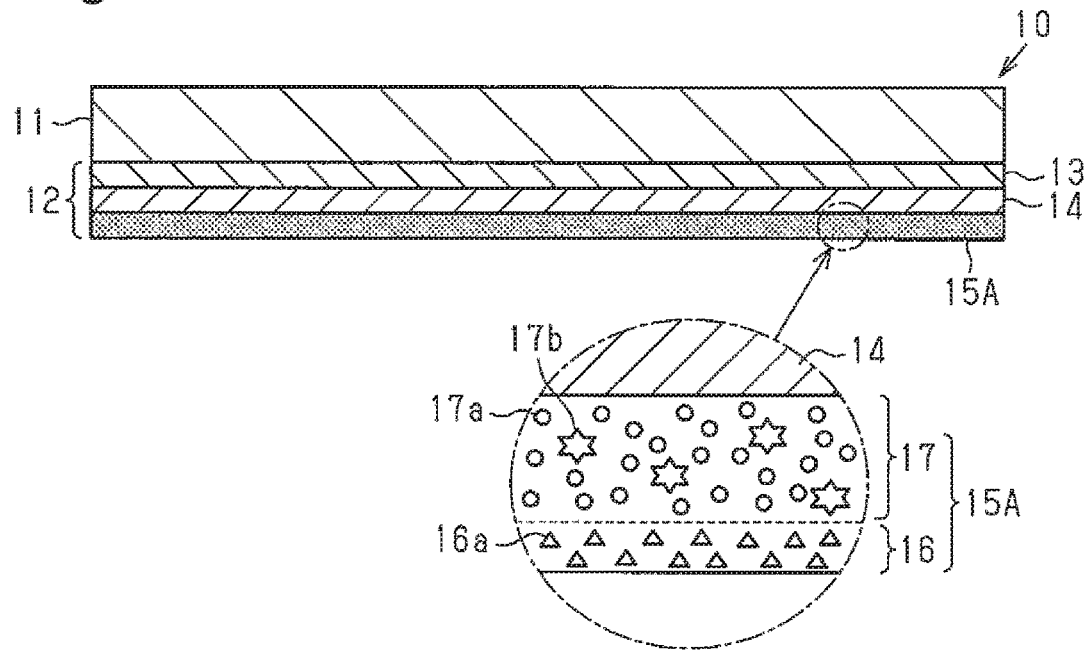
FIG. 1 is a cross-sectional view of a thermal transfer sheet.

As shown in FIG. 1, a thermal transfer sheet 10 has a support film 11 and a transfer layer 12 formed on the surface of the support film 11. The transfer layer 12 is the layer to be transferred to a transfer target (substrate) by thermal transfer processing (hot stamp processing) using thermocompression bonding. The support film 11 is a film for supporting the transfer layer 12.

The support film 11 is not particularly limited and a known support film for use in a thermal transfer sheet can be used. As the support film 11, a film made of a polyester such as polyethylene terephthalate, polypropylene, polycarbonate, vinyl chloride or polystyrene can be used.

The transfer layer 12 is a laminate having a protective layer 13, a decorative layer 14 and an adhesive layer 15A. The protective layer 13, the decorative layer 14 and the adhesive layer 15A are laminated in this order on the support film 11. Accordingly, one of the surfaces (obverse side) of the thermal transfer sheet 10 is formed of the adhesive layer 15A; whereas, the other surface (reverse side) of the thermal transfer sheet 10 is formed of the support film 11.

The protective layer 13 is the layer to be provided for improving, e.g., weather resistance, scratch resistance, and stain resistance of the transfer layer 12. The protective layer 13 is not particularly limited and a known protective layer for use in a thermal transfer sheet can be used. Examples of a material constituting the protective layer 13 include a urethane resin, an acrylic resin, a silicone resin and a fluorocarbon resin.

The decorative layer 14 is the layer that imparts a predetermined design property to the transfer layer 12. The decorative layer 14 is not particularly limited and a known decorative layer for use in a thermal transfer sheet can be used. Examples of the decorative layer 14 include an ink layer containing a pigment or a dye and a metal deposition layer formed by attaching a metal such as indium, chromium, aluminum, titanium or tin through vapor deposition.

The adhesive layer 15A is the layer that melts during thermal transfer processing to bond the transfer layer 12 to the surface of the transfer target (substrate). The adhesive layer 15A has a first adhesive layer 16 forming the surface of the thermal transfer sheet 10 and a second adhesive layer 17 laminated on the first adhesive layer 16. The first adhesive layer 16 is made of a first resin 16a having thermal plasticity and has a lower viscosity than the second adhesive layer 17. The second adhesive layer 17 is made of a second resin 17a having thermal plasticity and has a higher glass-transition point than the first adhesive layer 16.

The monomer units constituting the first resin and the monomer units constituting the second resin are partly or entirely identical. As the first resin and the second resin, polypropylene resins such as acryl-modified polypropylene, chlorinated polypropylene and maleic anhydride-modified polypropylene; and ethylene copolymers such as an ethylene-vinyl acetate copolymer, an ethylene-acrylic acid copolymer and an ethylene-ethyl acrylate copolymer, can be used.

Examples of the first resin and the second resin constituted by partly identical monomer units herein include resins mutually different in number of functional groups added to the monomer unit (for example, acryl-modified polypropylene different in degree of modification); resins mutually different in type of functional group added to the monomer unit (for example, acryl-modified polypropylene and a chlorinated polypropylene); and copolymer resins formed by polymerizing at least two types of monomers and mutually different in at least one monomer unit (for example, an ethylene-vinyl acetate copolymer and an ethylene-acrylic acid copolymer).

The first resin and the second resin constituted by partly identical monomer units may have the same or different molecular weight. The first resin and the second resin constituted by entirely identical monomer units may have the same or different molecular weight. The molecular weights (weight average molecular weight) of the first resin and the second resin are, for example, 60000 to 90000.

As mentioned above, the viscosity of the first adhesive layer 16 is set to be lower than the viscosity of the second adhesive layer 17. The viscosity mentioned above is the viscosity at the temperature of thermal transfer processing. The temperature of thermal transfer processing (the temperature that transmits to the adhesive layer during thermal transfer processing) is controlled to be the temperature at which the resin is softened and/or melted, in accordance with the type of resin used in the adhesive layer. More specifically, the above viscosities are the viscosities of the first adhesive layer 16 and the second adhesive layer 17 at the temperature of thermal transfer processing, which are set in accordance with the types of the first adhesive layer 16 and the second adhesive layer 17. The temperature of thermal transfer processing is 100 to 130° C. if the first resin 16a and the second resin 17a are, for example, polypropylene resins and 100 to 120° C. if the first resin 16a and the second resin 17a are ethylene copolymers.

As the viscosity at the temperature of thermal transfer processing, the viscosity of the first adhesive layer 16 is preferably ½ or less, more preferably ⅕ or less and further preferably ¹⁄₁₀ or less as low as the viscosity of the second adhesive layer 17. More specifically, the viscosity of the first adhesive layer 16 is preferably 5 to 300 Pa·s. The viscosity of the second adhesive layer 17 is preferably 400 to 15000 Pa·s. The viscosities of the first adhesive layer 16 and the second adhesive layer 17 and the magnitude relationship between them can be controlled by the types of the first resin 16a and the second resin 17a and combination thereof. For example, a resin having a lower viscosity than the second resin 17a is preferably used as the first resin 16a.

As mentioned above, the glass-transition point of the second adhesive layer 17 is set to be higher than the glass-transition point of the first adhesive layer 16. The glass-transition point of the second adhesive layer 17 is higher compared to the glass-transition point of the first adhesive layer 16 by preferably 8° C. or higher and more preferably 13° C. or higher, than the glass-transition point of the first adhesive layer 16 in terms of a numerical value obtained by thermomechanical analysis (TMA). The glass-transition point of the second adhesive layer 17 is preferably 30 to 100° C. and more preferably 40 to 70° C. The glass-transition points of the first adhesive layer 16 and the second adhesive layer 17 and the magnitude relationship between them can be controlled by the types of the first resin 16a and the second resin 17a and the combination thereof. For example, a resin having a higher glass-transition point than the first resin 16a is preferably used as the second resin 17a.

The second adhesive layer 17 contains a filler 17b. The filler 17b improves the water resistance of the adhesive layer 15A. The glass-transition point of the second adhesive layer 17 can be raised by adding the filler 17b in the second adhesive layer 17.

Examples of the filler 17b include an inorganic filler and an organic filler. Examples of the inorganic filler include silica, calcium carbonate, talc, wollastonite, mica and clay. Examples of the organic filler include resin beads made of a resin material such as an acrylic resin and a urethane resin. These fillers 17b may be added alone or at least two types of fillers may be added.

The average particle diameter of the filler 17b is preferably 10 to 1000 nm. The shape of the filler 17b is not particularly limited and any of shapes such as particle, fibrous and balloon shapes may be employed. The content of the filler 17b in the second adhesive layer 17 is preferably 5 to 30 mass %.

The thickness of the first adhesive layer 16 is preferably 0.05 to 1 µm. The thickness of the second adhesive layer 17 is preferably 0.5 to 3 µm. The second adhesive layer 17 is preferably thicker than the first adhesive layer 16. Particularly, the thickness of the second adhesive layer 17 is preferably 1.5 to 20 times as thick as the thickness of the first adhesive layer 16.

Next, the decorated article 20 to be produced by using the thermal transfer sheet 10 will be described.

Figure 2:
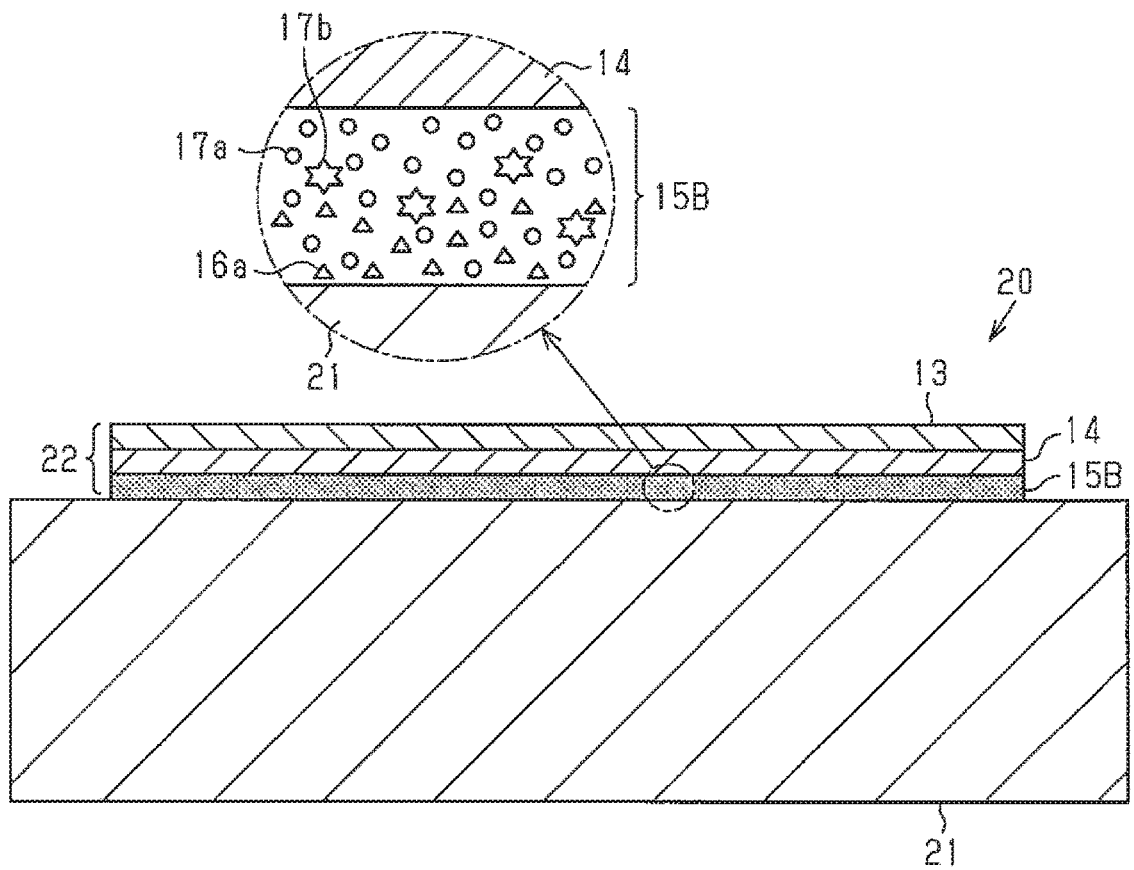
FIG. 2 is a cross-sectional view of a decorated article.

As shown in FIG. 2, the decorated article 20 is an article having a substrate 21 and a decoration layer 22 prepared by transferring the transfer layer 12 of the thermal transfer sheet 10 to a surface of the substrate 21. In forming the decorated article 20 by using the thermal transfer sheet 10, thermal transfer processing by thermocompression bonding is carried out in the state of laminating the thermal transfer sheet 10 on the surface of the substrate 21 such that the surface of the substrate 21 is allowed to be in contact with the first adhesive layer 16. Thereafter, the support film 11 is removed from the thermal transfer sheet 10 to form the decorated article 20.

As the substrate 21, a substrate made of a low melting-point resin or a substrate made of a high melting-point resin is used. The low melting-point resin refers to, for example, a resin having a softening temperature (obtained by TMA) of lower than 100° C. The high melting-point resin refers to, for example, a resin having a softening temperature (obtained by TMA) of 100° C. or higher. Examples of the resin constituting substrate 21 include polypropylene and polycarbonate. As the first resin 16a and the second resin 17a constituting the adhesive layer 15A of the thermal transfer sheet 10, resins constituted by partly or entirely identical monomer units with those of the resin constituting substrate 21, are preferably used. For example, for the substrate 21 made of polypropylene, it is preferable to use the thermal transfer sheet 10 containing the first resin 16a and the second resin 17a being polypropylene resins.

The temperature of thermal transfer processing (the temperature that transmits to the adhesive layer during thermal transfer processing) is appropriately set to be the temperature at which the resin is softened and/or melted in accordance with the types of the first resin 16a and the second resin 17a used in the adhesive layer 15A of the thermal transfer sheet 10. For example, if the first resin 16a and the second resin 17a are polypropylene resins, the temperature of thermal transfer processing is preferably 100 to 130° C.; and if the first resin 16a and the second resin 17a are ethylene copolymers, the temperature of thermal transfer processing is preferably 100 to 120° C.

The pressure to be applied during thermal transfer processing is not particularly limited and preferably 0.3 to 10 MPa.

As shown in FIG. 2, in the decorated article 20 formed through thermal transfer processing, the state of the adhesive layer 15B changes from the state of the adhesive layer 15A in the thermal transfer sheet 10. More specifically, when the adhesive layer 15A is softened and melted in the thermal transfer processing, a portion where the first resin 16a constituting the first adhesive layer 16 and the second resin 17a constituting the second adhesive layer 17 are mutually mixed, is formed in the adhesive layer 15B. To be more specific, in the adhesive layer 15B, the first resin 16a and the second resin 17a are mixed such that the ratio of the first resin 16a increases and the ratio of the second resin 17a decreases towards the substrate 21 in the thickness direction of the adhesive layer 15B. The adhesive layer 15B contains the filler 17b. The amount of the filler 17b also decreases toward the substrate 21 and increases toward the decorative layer 14 in the thickness direction of adhesive layer 15B. The adhesive layer 15B adheres to the substrate 21.

The decorated article 20 can be used as exterior trim parts and interior trim parts for vehicles, such as front grill, back panel and ornaments.

The operation and advantages of the present embodiment will now be described.

(1) The thermal transfer sheet 10 has the support film 11 and the transfer layer 12 provided on the surface of the support film 11. The transfer layer 12 has the decorative layer 14 and the adhesive layer 15A formed on the obverse side of the decorative layer 14. The adhesive layer 15A has the first adhesive layer 16 and the second adhesive layer 17 laminated on the first adhesive layer 16. The first adhesive layer 16 is positioned on the obverse side of the second adhesive layer 17. The first adhesive layer 16 is made of the first resin 16a having thermal plasticity and has a lower viscosity than the second adhesive layer 17. The second adhesive layer 17 is made of the second resin 17a having thermal plasticity and has a higher glass-transition point than first adhesive layer 16. The first resin 16a and the second resin 17a are resins constituted by partly or entirely identical monomer units.

If the thermal transfer sheet 10 having the above-described structure is used, even if the surface of the substrate 21 is not melted during thermal transfer processing, the decoration layer 22 excellent in water resistance is formed on the surface of substrate 21. Accordingly, no matter whether a resin constituting the substrate 21 has a low melting-point or a high melting-point, the decoration layer 22 excellent in water resistance is formed. As a result, the decorated article 20 having the decoration layer 22 excellent in water resistance is produced.

More specifically, in the adhesive layer 15A of the thermal transfer sheet 10, the second adhesive layer 17 constituted as a layer having a high glass-transition point suppresses water permeation into the substrate 21 due to its hard-to-flow nature. In contrast, the first adhesive layer 16 constituted as a low viscosity layer improves the adhesiveness to the substrate 21. More specifically, in thermal transfer processing, since the viscosity of the first adhesive layer 16 is set to be low, the first resin 16a constituting the first adhesive layer 16 easily enters the spaces between recesses and protrusions present on the surface of the substrate 21. Because of this, even if the surface of the substrate 21 does not melt, the adhesive layer 15B after thermal transfer processing is more tightly bonded to the substrate 21.

As a result, the adhesive layer 15B after thermal transfer processing acquires a structure where water passing through the adhesive layer 15B hardly permeates into the interface between the adhesive layer 15B and the substrate 21 by virtue of the effect of the second adhesive layer 17 having a high glass-transition point for suppressing water permeation and the effect of the first adhesive layer 16 having a low viscosity for improving adhesiveness to the substrate 21. Owing to this, e.g., removal of the decoration layer 22 caused by water permeating into the space between the adhesive layer 15B and the substrate 21, is suppressed. If the structure is designed to have either one of the first adhesive layer 16 and the second adhesive layer 17, the above-described effects, particularly, the effect of suppressing water permeation, cannot be obtained.

According to the thermal transfer sheet 10 having the above-described structure, if the substrate 21 is made of a high melting-point material, it is not necessary to raise the temperature during thermal transfer processing up to the melting point of the substrate 21 or higher. Accordingly, compared to a conventional thermal transfer sheet for which thermal transfer processing must be conducted on the substrate 21 made of a high melting-point material at a temperature of the melting point of the substrate or higher, costs required for heat-resistant materials to be used in, e.g., a member constituting the thermal transfer sheet 10, such as the support film 11 and an elastic member pressurizing the thermal transfer sheet 10 to the substrate during thermocompression bonding, can be saved.

(2) The second adhesive layer 17 contains the filler 17b.

According to the above structure, the effect of suppressing water permeation into the substrate 21 is enhanced, and thus, the water resistance of the decoration layer 22 is further improved. It is also easy to increase the glass-transition point of the second adhesive layer 17 to be higher than the glass-transition point of the first adhesive layer 16.

(3) The second adhesive layer 17 is thicker than the first adhesive layer 16.

According to the above structure, in the adhesive layer 15B after thermal transfer processing, a portion where the first resin 16a and the second resin 17a are mixed is easily to adhere to the substrate 21. If the portion where the first resin 16a and the second resin 17a are mixed, adheres to the substrate 21, the water resistance of the decoration layer 22 is further improved.

(4) The decorated article 20 has the substrate 21 and the decoration layer 22. The decoration layer 22 has the adhesive layer 15B and the decorative layer 14 sequentially laminated on the substrate 21. The adhesive layer 15B contains the first resin 16a and the second resin 17a having thermal plasticity. In the adhesive layer 15B, the first resin 16a and the second resin 17a are mixed such that the ratio of the first resin 16a increases and the ratio of the second resin 17a decrease toward the substrate 21 in the thickness direction of the adhesive layer 15B. The first resin 16a and the second resin 17a are resins constituted by partly or entirely identical monomer units. The first resin 16a is a resin having a lower viscosity than the second resin 17a. The second resin 17a is a resin having a higher glass-transition point than the first resin 16a.

According to the above structure, the water resistance of the decoration layer 22 is improved.

(5) Adhesive layer 15B contains filler 17b.

According to the above structure, the effect of suppressing water permeation into the substrate 21 is enhanced and the water resistance of the decoration layer 22 is further improved.

(6) The first resin 16a and the second resin 17a constituting the adhesive layer 15A of the thermal transfer sheet 10, and a resin constituting the substrate 21, are resins constituted by partly or entirely identical monomer units.

According to the above structure, the adhesive layer 15B after thermal transfer processing and the substrate 21 more tightly adhere and thus, the water resistance of decoration layer 22 is further improved.

The above-described embodiment may be modified as follows.

In the thermal transfer sheet 10, the layer containing filler 17b is not limited to the second adhesive layer 17. As long as the magnitude relationships of viscosity and glass-transition point between the first adhesive layer 16 and the second adhesive layer 17 satisfy the above-described relationships, the first adhesive layer 16 and the second adhesive layer 17 may both contain the filler 17b or the first adhesive layer 16 alone may contain the filler 17b. For the reason that the magnitude relationships of viscosity and glass-transition point are easily controlled, if the first adhesive layer 16 contains the filler 17b, the second adhesive layer 17 preferably contains the filler 17b. Also, neither the first adhesive layer 16 nor the second adhesive layer 17 may contain filler 17b.

In the thermal transfer sheet 10, the protective layer 13 may serve also as the decorative layer 14. As the protective layer 13 also serving as the decorative layer 14, the protective layer 13 colored with, e.g., a pigment, may be employed. If improvement of, e.g., weather resistance, scratch resistance, and stain resistance is not required, the protective layer 13 does not need to be provided. The same applies to the protective layer 13 and the decorative layer 14 of the decoration layer 22 in the decorated article 20.

The thermal transfer sheet 10 may have other layers. Examples of the other layers include a release layer, which is provided between the support film 11 and the protective layer 13, for facilitating removal of the support film 11 from the transfer layer 12 (the decoration layer 22).

In the decorated article 20, the adhesive layer 15B does not need to contain the filler 17b.

In the adhesive layer 15B of the decorated article 20, a portion where the first resin 16a and the second resin 17a are mixed or a portion consisting of the first resin 16a alone, may adhere to the substrate 21.

EXAMPLES

Examples of the above-described embodiment will now be described.

<Test 1>

Thermal transfer sheets of Examples 1 and 2 and Comparative Examples 1 to 3 having adhesive layer different in structure were made and then decorated articles were made by using the thermal transfer sheets of individual Examples. The decoration layers transferred to the individual decorated articles were evaluated for adhesiveness and water resistance.

[Thermal Transfer Sheet]

The thermal transfer sheet is a sheet having a multilayer structure prepared by laminating a protective layer, a decorative layer, and an adhesive layer sequentially on a surface of a support film. The materials and thicknesses of individual layers are as follows.

Support film: Film of 25 µm in thickness made of polyethylene terephthalate.

Protective layer: Resin layer of 4.0 µm in thickness made of an acrylic resin.

Decorative layer: Metal (indium) deposition layer of 35 nm in thickness formed by vapor deposition.

Adhesive layer (Example): Thermoplastic resin layer of a bilayer structure consisting of a first adhesive layer made of a first resin having thermal plasticity and a second adhesive layer made of a second resin having thermal plasticity positioned on the reverse side (decorative layer side) of the first adhesive layer.

Adhesive layer (Comparative Example): Thermoplastic resin layer of a monolayer structure made of a first resin or a second resin having thermal plasticity As to the adhesive layer, the types of first resin and second resin, and thickness and physical properties of individual layers are as shown in Table 1. The "viscosity" shown in Table 1 is the viscosity of each layer at 125° C., and "Tg" is the glass-transition point of each layer obtained by TMA. The resins shown in Table 1 are as follows.

Acryl modified PP-L: Acryl-modified polypropylene (the amount of acryl used in modification: medium)

Acryl modified PP-H: Acryl-modified polypropylene (the amount of acryl used in modification: high)

Chlorinated PP: Chlorinated polypropylene

[Decorated Article]

A thermal transfer sheet was disposed on a substrate (softening temperature: 160° C.) made of polypropylene such that the adhesive layer faced the substrate. Subsequently, the thermal transfer sheet was pressed on the substrate by means of an elastic material heated at a pressure force of 3 MPa. Two seconds later, application of pressure by the elastic material was terminated. Then, the thermal transfer sheet and substrate were cooled to room temperature. Thereafter, the support film was separated from the decoration layer (protective layer, decorative layer and adhesive layer) transferred to the substrate to obtain a decorated article.

[Evaluation of Adhesiveness]

The adhesiveness of the decorated articles thus obtained was evaluated by cross cut tape method specified in the former JIS K 5400. The results are shown in Table 1, Column of "Adhesiveness". The numerical value in Column "Adhesiveness" represents the number of grids where removal was observed (the total number of grids are 100).

[Evaluation of Water Resistance]

A dipping treatment was carried out by dipping the decorated articles obtained above in water of 40° C. for 240 hours. After the dipping treatment, the decoration layers of the decorated articles were visually observed to check the presence or absence of blisters. The results are shown in Table 1, Column of "Blister".

resistance is improved without a decrease in the adhesiveness of the decoration layer formed by the thermal transfer sheet.

<Test 2>

Thermal transfer sheets of Examples 3 to 8 were made by adding a filler in a second adhesive layer of the thermal transfer sheet of Example 1, and then, decorated articles were made by using the thermal transfer sheets of the individual Examples. Thermal transfer sheets of Comparative Examples 4 to 6 were made by adding a filler in the adhesive layer of the thermal transfer sheet of Comparative Example 1, as shown in Table 3, and then, decorated articles were made by using the thermal transfer sheets of individual Comparative Examples. The decoration layers transferred to individual decorated articles were evaluated for adhesiveness and water resistance

[Thermal Transfer Sheet]

The structures of the thermal transfer sheets are the same as in Example 1 and Comparative Example 1 of Test 1 except that silica (average particle diameter: 40 nm) was added as a filler to the second adhesive layer (adhesive layer in Comparative Examples). The contents of silica are as shown in Table 2 and Table 3.

The water vapor transmission rate shown in Table 2 and Table 3 is a water permeation index of each adhesive layer and represents that water permeation decreases as the numerical value decreases. The water vapor transmission rate was obtained by modifying the cup method specified in JIS Z 0208. First, a measurement sample was made by forming an adhesive layer of 20 μm on the surface of a

TABLE 1

|  |  | Example 1 | Example 2 | Comparative Example 1 | Comparative Example 2 | Comparative Example 3 |
|---|---|---|---|---|---|---|
| First adhesive layer | Thickness (μm) | 0.1 | 0.1 |  |  |  |
|  | First resin | Acryl modified PP-L | Chlorinated PP |  |  |  |
|  | Viscosity (Pa · s) | 29 | 268 |  |  |  |
|  | Tg (° C.) | 27 | 23 |  |  |  |
| Second adhesive layer (adhesive layer in Comparative Examples) | Thickness (μm) | 1.0 | 1.0 | 1.0 | 1.0 | 1.0 |
|  | Second resin | Acryl modified PP-H | Acryl modified PP-H | Acryl modified PP-H | Acryl modified PP-L | Chlorinated PP |
|  | Viscosity (Pa · s) | 562 | 562 | 562 | 29 | 268 |
|  | Tg (° C.) | 37 | 37 | 37 | 27 | 23 |
| Evaluation | Adhesiveness | 0/100 | 0/100 | 0/100 | 0/100 | 0/100 |
|  | Blister (40° C. × 240 h) | Absent | Absent | Present | Present | Present |

As shown in Table 1, the adhesiveness levels of the decoration layers formed by using the thermal transfer sheets of Examples 1 and 2 having an adhesive layer formed of a predetermined bilayer structure were the same as in the decoration layers formed by using the thermal transfer sheets of Comparative Examples 1 to 3 having an adhesive layer formed of a monolayer-structure. In the decoration layers formed by using the thermal transfer sheets of Comparative Examples 1 to 3, small blisters were observed after the dipping treatment at 40° C. for 240 hours; whereas, in the decoration layers formed by using the thermal transfer sheets of Examples 1 and 2, no blisters were observed after the same dipping treatment. From these results, it was found that if an adhesive layer of a thermal transfer sheet is constituted of a predetermined bilayer structure, the water polyimide film of 25 μm in thickness. As a blank, a polyimide film of 25 μm in thickness having no adhesive layer formed thereon was prepared. The measurement sample and the polyimide film as a blank were subjected to the cup method and an increase in mass of the moisture absorbent were obtained in each case. Subsequently, water vapor transmission rate of each adhesive layer was computationally obtained based on the following Expression.

(Water vapor transmission rate)=(increase in mass of moisture absorbent during use of measurement sample)/(increase in mass of moisture absorbent during use of blank)×100

[Decorated Article]

The decorated articles are the same as in Test 1.

[Evaluation of Adhesiveness]

Evaluation was carried out in the same manner as in Test 1. The results are shown in Table 2 and Table 3.

[Evaluation of Water Resistance]

A dipping treatment was carried out by dipping the decorated articles obtained above in water of 40° C. for 240 hours. Another dipping treatment was carried out by dipping the decorated articles obtained above in water of 60° C. for 24 hours. The decoration layers of decorated articles after individual dipping treatments, were visually observed to check the presence or absence of blisters. The results are shown in Table 2 and Table 3. Evaluation of decorated articles obtained from the thermal transfer sheets of Comparative Examples after the dipping treatment at 60° C. for 24 hours was omitted.

transition point of the second adhesive layer, no blisters were observed even after the dipping treatment carried out at 60° C. for 24 hours. Reduction in adhesiveness by addition of silica was not observed. From these results, it was found that water resistance of the decoration layer formed from the thermal transfer sheet is improved by adding a filler to the adhesive layer of the thermal transfer sheet.

As shown in Table 3, in the decoration layers formed by using the thermal transfer sheets containing silica, according to Comparative Examples 4 to 6, blisters were observed after dipping treatment was carried out at 40° C. for 240 hours. Accordingly, the water resistance of the decoration layers formed by using the thermal transfer sheets containing silica, according to Comparative Examples 4 to 6, was the same as in the decoration layer formed by using the thermal

TABLE 2

| | | Example 1 | Example 3 | Example 4 | Example 5 | Example 6 | Example 7 | Example 8 |
|---|---|---|---|---|---|---|---|---|
| First adhesive layer | Thickness (μm) | | | | 0.1 | | | |
| | First resin | | | | Acryl modified PP-L | | | |
| | Viscosity (Pa · s) | | | | 29 | | | |
| | Water vapor transmission rate (%) | | | | 88 | | | |
| | Tg (° C.) | | | | 27 | | | |
| Second adhesive layer | Thickness (μm) | | | | 1.0 | | | |
| | Second resin | | | | Acryl modified PP-H | | | |
| | Silica (mass %) | 0 | 5 | 10 | 15 | 20 | 25 | 30 |
| | Viscosity (Pa · s) | 562 | 521 | 553 | 593 | 1929 | 9341 | 13520 |
| | Tg (° C.) | 37 | 42 | 54 | 55 | 56 | 62 | 67 |
| | Water vapor transmission rate (%) | 75 | 68 | 55 | 49 | 48 | 45 | 43 |
| Evaluation | Adhesiveness | 0/100 | 0/100 | 0/100 | 0/100 | 0/100 | 0/100 | 0/100 |
| | Blister (40° C. × 240 h) | Absent | Absent | Absent | Absent | Absent | Absent | Absent |
| | Blister (60° C. × 24 h) | Present | Absent | Absent | Absent | Absent | Absent | Absent |

TABLE 3

| | | Comparative Example 1 | Comparative Example 4 | Comparative Example 5 | Comparative Example 6 |
|---|---|---|---|---|---|
| Adhesive layer | Thickness (μm) | | | 1.0 | |
| | Second resin | | | Acryl modified PP-H | |
| | Silica (mass %) | 0 | 10 | 20 | 30 |
| | Viscosity (Pa · s) | 562 | 553 | 1929 | 13520 |
| | Tg (° C.) | 37 | 54 | 56 | 67 |
| | Water vapor transmission rate (%) | 75 | 55 | 48 | 43 |
| Evaluation | Adhesiveness | 0/100 | 0/100 | 0/100 | 0/100 |
| | Blister (40° C. × 240 h) | Present | Present | Present | Present |

As shown in Table 2, in the decoration layer formed by using the thermal transfer sheet of Example 1 after the dipping treatment at 40° C. for 240 hours, no blisters were observed; however, small blisters were observed after the dipping treatment carried out in more severe conditions, i.e., 60° C. for 24 hours. In contrast, in the decoration layers formed by using the thermal transfer sheets of Examples 3 to 8 formed by adding silica, thereby increasing the glasstransfer sheet containing no silica according to Comparative Example 1. The results suggest that the effect of improving water resistance by adding a filler is intrinsic to the case where the adhesive layer of the thermal transfer sheet is formed of a predetermined bilayer structure.

<Test 3>

The thermal transfer sheets of Examples 9 to 11 different in thickness of the first adhesive layer from the thermal transfer sheet of Example 6 were made, and then, decorated articles were made by using the thermal transfer sheets of the individual Examples. The decoration layers transferred to individual decorated articles were evaluated for adhesiveness and water resistance.

[Thermal Transfer Sheet]

The structures of the thermal transfer sheets are the same as that of Example 6 of Test 2 except that the thicknesses of the first adhesive layers were varied. The thicknesses of the first adhesive layers are as shown in Table 4.

[Decorated Article]

The decorated articles are the same as in Test 1.

[Evaluation of Adhesiveness]

Evaluation was carried out in the same manner as in Test 1. The results are shown in Table 4.

[Evaluation of Water Resistance]

Evaluation was carried out in the same manner as in Test 2. The results are shown in Table 4.

TABLE 4

|  |  | Example 6 | Example 9 | Example 10 | Example 11 |
|---|---|---|---|---|---|
| First adhesive layer | Thickness (μm) | 0.1 | 0.3 | 0.5 | 1.0 |
|  | First resin | Acryl modified PP-L | | | |
|  | Viscosity (Pa·s) | 29 | | | |
|  | Tg (°C.) | 27 | | | |
| Second adhesive layer | Thickness (μm) | 1.0 | | | |
|  | Second resin | Acryl modified PP-H | | | |
|  | Silica (mass %) | 20 | | | |
|  | Viscosity (Pa·s) | 1929 | | | |
|  | Tg (°C.) | 56 | | | |
| Evaluation | Adhesiveness | 0/100 | 0/100 | 0/100 | 0/100 |
|  | Blister (40° C. × 240 h) | Absent | Absent | Absent | Absent |
|  | Blister (60° C. × 24 h) | Absent | Absent | Absent | Present |

As shown in Table 4, in the decoration layers formed by using the thermal transfer sheets of Examples 6, 9 and 10 in which the thickness of the first adhesive layer is less than the thickness of the second adhesive layer, no blisters were observed after dipping treatment at 40° C. for 240 hours as well as dipping treatment at 60° C. for 24 hours. In contrast, in the decoration layer formed by using the thermal transfer sheet of Example 11 in which the thickness of the first adhesive layer is the same as the thickness of the second adhesive layer, blisters were observed after the dipping treatment carried out at 60° C. for 24 hours.

From the results, it was found that if the thickness of the second adhesive layer of a thermal transfer sheet is larger than that of the first adhesive layer, the decoration layer formed by using the thermal transfer sheet is improved in water resistance. The effect of improving water resistance based on thickness of the first adhesive layer and second adhesive layer of a thermal transfer sheet is considered to be based on the fact that, since the first adhesive layer becomes thin in relative terms, the second resin constituting the second adhesive layer reaches the adhesive surface to the substrate, and a portion where the first resin and the second resin are mixed adheres to the substrate. When the decoration layer formed by using the thermal transfer sheet having a second adhesive layer containing a marker, was analyzed, it was confirmed that the marker reaches to the adhesive surface to the substrate, although details of test results are omitted.

The invention claimed is:

1. A thermal transfer sheet comprising a support film and a transfer layer provided on one surface of the support film, wherein the transfer layer at least includes a decorative layer and an adhesive layer provided on an obverse side of the decorative layer, the adhesive layer includes a first adhesive layer and a second adhesive layer laminated on the first adhesive layer, the first adhesive layer being positioned on an obverse side of the second adhesive layer, the first adhesive layer is made of a first resin having thermal plasticity and has a lower viscosity than the second adhesive layer, the second adhesive layer is made of a second resin having thermal plasticity and has a higher glass-transition point than the first adhesive layer, and monomer units constituting the first resin and monomer units constituting the second resin are partly or entirely identical.

2. The thermal transfer sheet according to claim 1, wherein at least one of the first adhesive layer and the second adhesive layer contains a filler.

3. The thermal transfer sheet according to claim 1, wherein the second adhesive layer is thicker than the first adhesive layer.

4. A method for producing a decorated article that includes a substrate, an adhesive layer, and a decorative layer, the adhesive layer and the decorative layer being sequentially laminated on the substrate, the method comprising:

disposing the thermal transfer sheet according to claim 1 on the substrate such that the adhesive layer of the thermal transfer sheet is in contact with the substrate;

conducting thermal transfer processing to transfer the transfer layer to the substrate; and removing the support film of the thermal transfer sheet.

5. A decorated article comprising a substrate, an adhesive layer, and a decorative layer, the adhesive layer and the decorative layer being sequentially laminated on the substrate, wherein the adhesive layer contains a first resin and a second resin that have thermal plasticity, the first resin and the second resin are mixed in the adhesive layer such that a ratio of the first resin increases and a ratio of the second resin decreases toward the substrate in a thickness direction of the adhesive layer, monomer units constituting the first resin and monomer units constituting the second resin are partly or entirely identical, the first resin has a lower viscosity than the second resin, and the second resin has a higher glass-transition point than the first resin.

6. The decorated article according to claim 5, wherein the adhesive layer contains a filler.

* * * * *